United States Patent
Jakkula et al.

(10) Patent No.: US 11,860,897 B2
(45) Date of Patent: Jan. 2, 2024

(54) METHOD FOR USING CATCH-UP LOGGING TO TIME-SYNCHRONIZE OBJECT STORES DURING MAINTENANCE OR RECOVERY OPERATIONS

(71) Applicant: STELLUS TECHNOLOGIES, INC., San Jose, CA (US)

(72) Inventors: Vijaya Jakkula, San Jose, CA (US); Venkata Bhanu P. Gollapudi, Pleasanton, CA (US); Siva Ramineni, Milpitas, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 639 days.

(21) Appl. No.: 16/435,331

(22) Filed: Jun. 7, 2019

(65) Prior Publication Data
US 2020/0387523 A1 Dec. 10, 2020

(51) Int. Cl.
| | |
|---|---|
| *G06F 16/27* | (2019.01) |
| *G06F 1/14* | (2006.01) |
| *G06F 9/38* | (2018.01) |
| *G06F 3/06* | (2006.01) |
| *G06F 11/14* | (2006.01) |

(52) U.S. Cl.
CPC .......... *G06F 16/275* (2019.01); *G06F 3/065* (2013.01); *G06F 3/067* (2013.01); *G06F 3/0652* (2013.01); *G06F 9/3891* (2013.01); *G06F 11/1471* (2013.01); *G06F 3/0607* (2013.01)

(58) Field of Classification Search
CPC ...... G06F 16/275; G06F 3/065; G06F 3/0652; G06F 3/067; G06F 9/3891; G06F 11/1471; G06F 3/0607; G06F 3/061; G06F 16/273; G06F 16/215; G06F 16/183; G06F 16/1844
See application file for complete search history.

(56) References Cited

U.S. PATENT DOCUMENTS

| | | |
|---|---|---|
| 7,647,329 B1 | 1/2010 | Fischman et al. |
| 9,875,167 B1 | 1/2018 | Norrie et al. |
| 10,210,171 B2 | 2/2019 | Outcalt et al. |

(Continued)

FOREIGN PATENT DOCUMENTS

| | | |
|---|---|---|
| CN | 102882927 B | 12/2016 |
| CN | 108140031 A | 6/2018 |

(Continued)

OTHER PUBLICATIONS

Taiwanese Office Action for TW Application No. 109115959 dated Sep. 8, 2023, 8 pages.

*Primary Examiner* — Hosain T Alam
*Assistant Examiner* — Chongsuh Park
(74) *Attorney, Agent, or Firm* — Lewis Roca Rothgerber Christie LLP

(57) ABSTRACT

Provided is a method of synchronizing a distributed object store including a plurality of data stores, the method including bringing a first data store of the data stores online after having been offline, choosing a second data store of the data stores, the second data store being online while the first data store was offline, reading, by the first data store, an entry from a catch-up log, and performing a data modification operation corresponding to the entry on the first data store to synchronize the plurality of data stores.

20 Claims, 3 Drawing Sheets

(56) References Cited

U.S. PATENT DOCUMENTS

| | | |
|---|---|---|
| 11,240,298 B2 | 2/2022 | Pucha et al. |
| 2005/0049945 A1 | 3/2005 | Bourbonnais et al. |
| 2005/0235019 A1 | 10/2005 | Yang |
| 2014/0006354 A1* | 1/2014 | Parkison ............... G06F 16/183 707/661 |
| 2019/0012238 A1* | 1/2019 | Butterworth ........ G06F 11/2048 |
| 2020/0311029 A1* | 10/2020 | Demoor ................ G06F 3/0604 |

FOREIGN PATENT DOCUMENTS

| | | |
|---|---|---|
| CN | 109271450 A | 1/2019 |
| TW | 201601056 A | 1/2016 |
| TW | 201737054 A | 10/2017 |
| TW | 201837719 A | 10/2018 |

* cited by examiner

METHOD FOR USING CATCH-UP LOGGING TO TIME-SYNCHRONIZE OBJECT STORES DURING MAINTENANCE OR RECOVERY OPERATIONS

FIELD

One or more aspects of embodiments of the present disclosure relate generally to methods of synchronizing data stores of a distributed object store, and a distributed object store configured to perform the methods.

BACKGROUND

Distributed object stores achieve performance, scalability, and data resiliency through data replication, and through balanced data distribution. For example, data is distributed across different data stores (e.g., disks) of an underlying cluster of data stores of the distributed system.

A downside to balanced data distribution in conventional distributed object stores is that any outage or failure of a data store in the cluster will generally cause a data distribution algorithm in the object store to be rerun. Running the distribution algorithm will potentially move impacted data corresponding to the failed data store to thereby restore data resiliency and balanced distribution in the underlying cluster. Moving impacted data may cause suboptimal performance of the distributed object store because, during the data redistribution operation, system performance may be negatively affected as a result of additional background I/Os that perform data migration and duplication to restore data resiliency.

SUMMARY

Embodiments described herein provide improvements to methods of synchronizing a distributed object store after bringing a data store of the distributed system back online.

According to one embodiment of the present disclosure, there is provided a method of synchronizing a distributed object store including a plurality of data stores, the method including bringing a first data store of the data stores online after having been offline, choosing a second data store of the data stores, the second data store being online while the first data store was offline, reading, by the first data store, an entry from a catch-up log, and performing a data modification operation corresponding to the entry on the first data store to synchronize the plurality of data stores.

The method may further include causing the first data store to go offline in accordance with a planned maintenance operation before bring the first data store online.

The method may further include storing the catch-up log on multiple nodes of a cluster underlying the distributed object store.

The catch-up log may be an unordered set of entries and corresponding to respective data modification operations to be performed on the first data store.

The entry may indicate a key corresponding to a data object, and a type of the data modification operation to be performed with respect to the data object.

The entry may include a delete entry, the data modification operation may include a delete operation to delete an object, and the method may further include checking, by the first data store, the second data store to determine whether the object is contained in the second data store, discarding, by the first data store, the delete entry when the object is contained in the second data store, and performing, by the first data store, the delete operation to delete the object from the first data store when the object is absent from the second data store.

The entry may include a write entry, the data modification operation may include a write operation to write an object, and the method may further include checking, by the first data store, the second data store to determine whether the object is contained in the second data store, discarding, by the first data store, the write entry when the object is absent from the second data store, and performing, by the first data store, the write operation to write the object to the first data store when the object is in the second data store.

According to another embodiment of the present disclosure, there is provided a distributed object store including a plurality of data stores, the distributed object store being configured to be synchronized by bringing a first data store of the data stores online after having been offline, choosing one or more stores of the data stores, the chosen stores being online while the first data store was offline (e.g., choosing a second data store of the data stores, the second data store being online while the first data store was offline), reading, by the first data store, an entry from a catch-up log, and performing a data modification operation corresponding to the entry on the first data store to synchronize the plurality of data stores.

The distributed object store may be further configured to be synchronized by causing the first data store to go offline in accordance with a planned maintenance operation before bring the first data store online.

The distributed object store may be further configured to be synchronized by storing the catch-up log on multiple nodes of a cluster underlying the distributed object store.

The catch-up log may be an unordered set of entries and corresponding to respective data modification operations to be performed on the first data store.

The entry may indicate a key corresponding to a data object, and a type of the data modification operation to be performed with respect to the data object.

The entry may include a delete entry, the data modification operation may include a delete operation to delete an object, and the distributed object store may be further configured to be synchronized by checking, by the first data store, the second data store to determine whether the object is contained in the second data store, discarding, by the first data store, the delete entry when the object is contained in the second data store, and performing, by the first data store, the delete operation to delete the object from the first data store when the object is absent from the second data store.

The entry may include a write entry, the data modification operation may include a write operation to write an object, and the distributed object store may be further configured to be synchronized by checking, by the first data store, the second data store to determine whether the object is contained in the second data store, discarding, by the first data store, the write entry when the object is absent from the second data store, and performing, by the first data store, the write operation to write the object to the first data store when the object is in the second data store.

According to yet another embodiment of the present disclosure, there is provided a non-transitory computer readable medium implemented on a distributed object store system, the non-transitory computer readable medium having computer code that, when executed on a processor, implements a method of synchronizing a distributed object store including a plurality of data stores, the method including bringing a first data store of the data stores online after having been offline, choosing a second data store of the data stores, the second data store being online while the first data store was offline, reading, by the first data store, an entry from a catch-up log, and performing a data modification operation corresponding to the entry on the first data store to synchronize the plurality of data stores.

The computer code, when executed by the processor, may further implement the method of synchronizing the distributed object store by causing the first data store to go offline in accordance with a planned maintenance operation before bring the first data store online.

The computer code, when executed by the processor, may further implement the method of synchronizing the distributed object store by storing the catch-up log on multiple nodes of a cluster underlying the distributed object store.

The catch-up log may be an unordered set of entries and corresponding to respective data modification operations to be performed on the first data store.

The entry may indicate a key corresponding to a data object, and a type of the data modification operation to be performed with respect to the data object.

The entry may include a delete entry, the data modification operation may include a delete operation to delete an object, and the computer code, when executed by the processor, may further implement the method of synchronizing the distributed object store by checking, by the first data store, the second data store to determine whether the object is contained in the second data store, discarding, by the first data store, the delete entry when the object is contained in the second data store, and performing, by the first data store, the delete operation to delete the object from the first data store when the object is absent from the second data store.

Accordingly, the distributed object store of embodiments of the present disclosure is able to achieve improved performance by avoiding unnecessary migration and/or duplication of data following an outage of a data store of the distributed system.

BRIEF DESCRIPTION OF THE DRAWINGS

The abovementioned and/or other aspects will become apparent and more readily appreciated from the following description of the embodiments, taken in conjunction with the accompanying drawings, in which.

DETAILED DESCRIPTION

Figure 1:
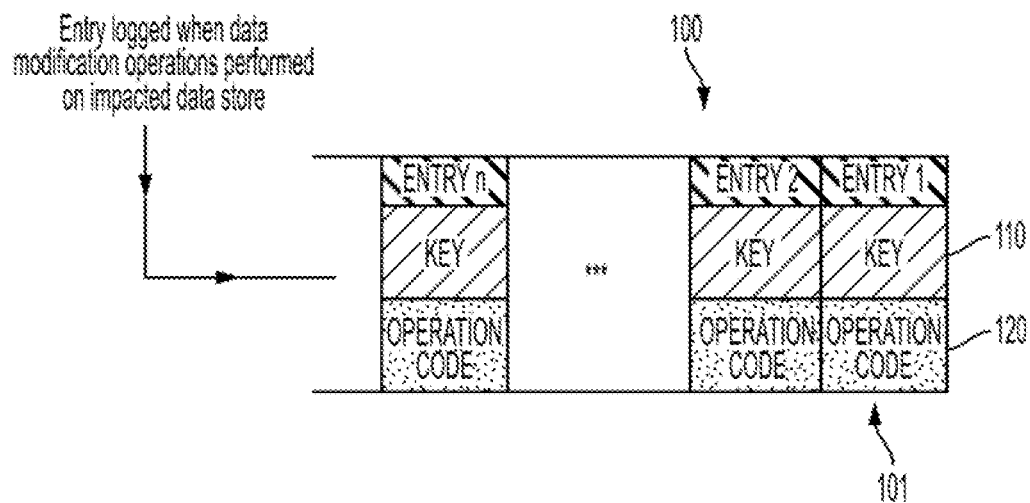
FIG. 1 depicts a conceptual view of a catch-up log, according to one or more embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

A distributed object store includes a cluster of separate data stores (e.g., disks). Each of the data stores is able to store data, or objects, thereon. Generally, the distributed object store will seek to keep the various data stores evenly balanced. By keeping the data stores relatively balanced, the distributed object store is able to prevent one of the data stores from running out of space while others have available space, thereby avoiding access hotspots.

Some of the data stores of the distributed object store will store replica data. That is, one data store may store objects that are duplicated on one or more other data stores. Accordingly, the distributed object store will allow for data replication to tolerate against the failure of one of the data stores.

During a planned maintenance operation (e.g., when taking a data store offline to upgrade the data store), the remaining data stores of the distributed object store will remain operative. However, commands for performing a data modification operation that involves the offline data store may continue while the data store is offline. For example, the distributed object store may receive a new write command for performing a write on the offline data store during the maintenance operation.

If a resiliency requirement corresponding to the object that is intended to be written on the offline data store requires that the object be written to two different data stores, the distributed object store will ensure that the object is written to two other online data stores. This may cause a large degree of work for the distributed object store, as a relatively large amount of data may be moved between the various data stores of the distributed object store during balancing.

In a conventional distributed object store, the amount of data movement depends upon a data distribution algorithm used by the object store for controlling data distribution in the cluster of data stores. The amount of data movement will be, in a best case scenario, at least equal to the amount of data that is impacted by the outage of the offline data store.

However, the amount of data movement will more commonly be greater than only the amount of data that is impacted by the outage because the data distribution algorithm will also generally seek to achieve balanced data distribution in the cluster of data stores. That is, it is possible additional data beyond the data that is impacted due to an outage of a data store will also be moved across the cluster during activity directed by the data distribution algorithm.

Accordingly, the conventional distributed object store redistributes data in the cluster to restore resiliency and balanced distribution. An amount of time for completing the data redistribution will be proportional to the amount of data that is being redistributed. As the distributed object store scales, planned outages of individual components (e.g., maintenance of data stores) will occur while the object store remains operational. However, triggering a data redistribution operation to synchronize the individual data stores across the cluster of the distributed object store after a planned outage generally inhibits performance of the object store immediately after any planned maintenance operation.

Embodiments of the present disclosure provide high performance for a distributed object store by avoiding data redistribution as the primary means to synchronize data across the cluster, while also enabling the restoration of resiliency and balanced data distribution after a planned outage.

Embodiments of the present disclosure also provide a method of efficiently tracking changes that are directed to impacted data stores during planned outages while using a reduced or minimal amount of information, and efficiently synchronizing the impacted stores when they come back online after a planned outage.

Accordingly, embodiments of the present disclosure improve memory technology by providing a highly performant distributed object store that enables a large degree of concurrency and parallelism in data replication operations by providing a solution that is available during maintenance operations in distributed systems.

FIG. 1 depicts a conceptual view of a catch-up log, according to one or more embodiments of the present disclosure.

Referring to FIG. 1, the present embodiment provides a mechanism that is referred to herein as a "catch-up log." The catch-up log 100 is a log of entries that respectively represent data modification operations that are to be performed on an underlying data store (e.g., an affected data store, or data store "A," which is described below with respect to FIGS. 2 and 3 below). Commands for the data modification operations are received when the underlying data store is offline (e.g., during a planned maintenance operation). The catch-up log 100 enables synchronization of the underlying data store with other data stores in the cluster to restore data resiliency and consistency.

To enable use of the catch-up log 100, the present embodiment provides a mechanism of logging data modification operations that occur during a planned outage in parallel with zero contention. The present embodiment also provides a mechanism that processes the entries in the catchup-log in parallel, and that scales linearly with the size of the cluster to efficiently bring data stores back online once respectively planned outages are complete.

As shown in FIG. 1, an object store of the present embodiment organizes data using a key-value pair 101, wherein a key 110 of the key-value pair 101 is the object identifier, and a value 120 which contains an operation type of the key-value pair 101 is opaque data associated with the object identifier. As will be described further below, the catch-up log does not log the entirety of the data, but instead logs the type of the operation on the key. That is, one aspect of the disclosed embodiments is that the catch-up log does not log data, but instead simply logs the key and the operation type. The replay of the catch-up log depends upon reading the data from the good, online stores (i.e., relevant stores that were online during the planned outage), and then updating the store that returns to be online (i.e., after being offline during the planned outage). This allows for a small amount of memory that is able to keep track of a large number of changes, which generally increases the amount of downtime that can be supported.

During a data store outage, a catch-up log 100 is generated for tracking data modification operations that occur during the outage and that involve the offline data store. For example, if a data entry on an offline data store is to be deleted or modified, when the data store comes back online, the data store can simply read, or replay, the entries of the catch-up log 100 to synchronize with the remaining data stores of the cluster.

The catch-up log 100 uses only two pieces of information—the key 110 of the data being modified, and an operation type (e.g., write, delete, etc.) of the data modification operation. Accordingly, the size of an entry in the catch-up log 100 is able to be relatively small, thereby allowing a large number of entries to be logged without bloating memory or storage requirements. Small catch-up log entries, therefore, also allow for increased time for a planned outage of a data store.

In the present embodiment, the catch-up log 100 is organized to allow multiple hardware threads to log entries (e.g., data modification operations) into the catch-up log 100 in parallel.

The cluster of the distributed object store may include a plurality of nodes (e.g., nodes 210, 220 described with respect to FIGS. 2 and 3 below). Each node in the cluster can have an independent catch-up log 100, and each independent catch-up log 100 may be organized to have independent partitions for each respective hardware thread. Accordingly, multiple writers in the cluster are able to log entries in the catch-up log 100 in parallel without contention, and the multiple writers thus have zero impact on the performance IO path during the planned outage.

When a data store comes back online (e.g., after completion of a planned maintenance operation), the object store may be synchronized. The object store is synchronized by processing the catch-up log 100 once the data store is online (e.g., following completion of the planned outage) to synchronize an affected data store(s) with the rest of the cluster.

To synchronize the affected data store(s), a reference data store(s) is selected. Reference data stores are stores that remained online during the planned outage of the affected data store, and that have stored thereon the data that is used to synchronize the affected data store.

Once the reference data stores are selected, the entries from the catch-up log 100 may be read, or replayed. When an entry of the catch-up log 100 is read, the affected data store may access data, which corresponds to the key 110 included in the entry, from the reference data store(s). Then, the object store may perform a data modification operation, which is indicated by the entry in the catch-up log 100, on the affected data store.

To enable parallelism during both a logging phase for generating the catch-up log 100, and a replay phase for performing data modification operations corresponding to the entries of the catch-up log 100, the present embodiment provides a mechanism for handling ordering constraints.

Figure 2:
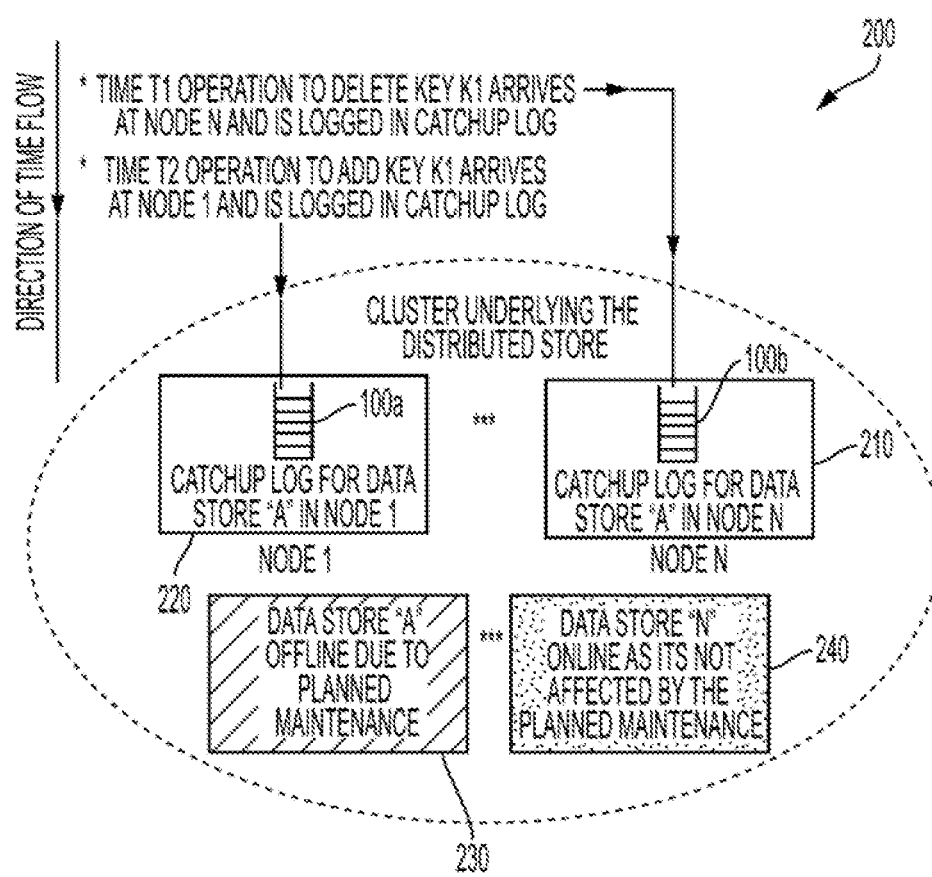
FIG. 2 depicts logging entries in a catch-up log that correspond to different dependent data modification operations respectively handled by different nodes in an underlying cluster of a distributed object store, according to one or more embodiments of the present disclosure.

FIG. 2 depicts logging entries in a catch-up log 100 that correspond to different dependent data modification operations that are respectively handled by different nodes in an underlying cluster of a distributed object store, according to one or more embodiments of the present disclosure.

Referring to FIG. 2, in the present example, a catch-up log 100 is created to log data modification operations being performed on an affected data store (data store "A") 230 that is currently offline due to planned maintenance. In the present example, a data modification operation concerning the affected data store 230 is received in "NODE N" 210, and another data modification operation concerning the affected data store 230 is received in "NODE 1" 220.

Conventionally, if the order of the playback of the entries in the catch-up log 100 by an affected data store is incorrect, the recovery operation may unnecessarily delete a valid object in the affected data store 230. For example, during the planned maintenance operation, there may first be an entry added to the catch-up log 100b corresponding to a delete operation of an object stored on the affected data store 230, and there may thereafter be another entry added to the catch-up log 100a corresponding to a write operation to write the object back into the affected data store 230.

That is, at a first time T1, an operation to delete a key K1 arrives at a given node (NODE N) 210, and is logged in a catch-up log 100b stored on the node 210. Then, at a later second time T2, an operation to add the key K1 arrives at a different node (NODE 1) 220, and is logged in a catch-up log 100a stored on the other node 220.

Accordingly, if the entry corresponding to the write operation at the later time T2 is read first from the catch-up log upon reactivation of the affected data store 210, the key will be populated in the affected data store 320. However this key will be deleted when the entry corresponding to the delete operation occurring at an earlier time T1 is read later from the catch-up log, causing the valid entry in the affected data store to be deleted. This can cause data loss due to the ordering constraint between the operations performed at time T1 and T2.

Figure 3:
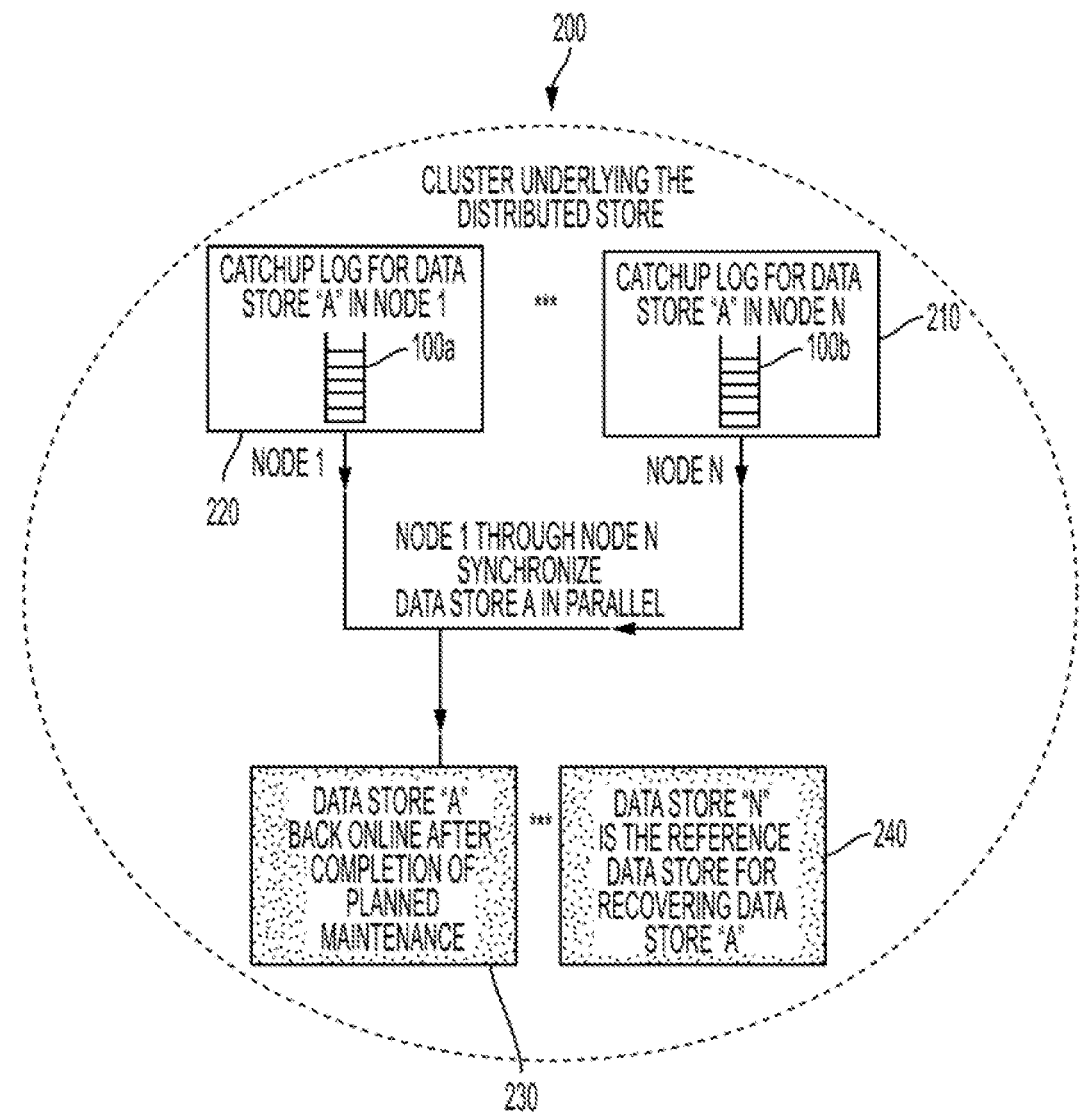
FIG. 3 depicts parallel synchronization of the distributed object store, after bringing a data store online, by reading the entries of the catch-up log from the different nodes in the underlying cluster of the distributed object store, according to one or more embodiments of the present disclosure.

FIG. 3 depicts parallel synchronization of the distributed object store, after bringing a data store online, by reading the entries of the catch-up log from the different nodes in the underlying cluster of the distributed object store, according to one or more embodiments of the present disclosure.

Referring to FIG. 3, embodiments of the present disclosure avoid unnecessary data movement (e.g., from the reference data store 240 to the affected data store 230) by avoiding ordering constraints that would otherwise require the catch-up log entries to be replayed in a sequential, time-ordered fashion, and that would therefore inhibit parallel recovery of affected data stores 230.

That is, embodiments of the present disclosure avoid ordered playback, which would otherwise require the ability to sort the entries in the catch-up log 100 based on a reference time in the cluster 200, and to sequentially playback entries in the sorted list. Such ordered playback would prevent synchronization of the affected data store 230 to be done in parallel in the cluster 200.

Instead, the present embodiment solves issues arising from ordering constraints by effectively making the catch-up log 100 an unordered set of entries representing data modification operations. By having an unordered catch-up log 100, the present embodiment enables parallel logging of operations during planned maintenance, and parallel recovery during synchronization of the data store, thereby unlocking scalability and performance in the distributed object store for these operations.

In the present embodiment, ordering constraints between different entries in the catch-up log 100 are eliminated as follows.

After determining a data modification operation to perform in accordance with an entry in the catch-up log 100, the object store may synchronize the data modification operation on a specified key 110 in the affected data store 230 by using a lock that is specific to that key 110. Accordingly, only one thread is able to modify the data corresponding to the key 110.

The affected data store 230 may then check to determine whether the object has been erased from a reference data store 240. That is, the affected data store may walk the reference store to determine whether the object corresponding to the data modification operation was deleted from the reference store while the affected data store 230 was offline, and whether the object remains deleted.

If the entry corresponds to a delete operation, and if the affected data store 230 determines that the object exists in the reference data store 240, then the catch-up log entry corresponding to that object is not processed, but is instead discarded. That is, by determining that the object exists in the reference data store 240, the affected data store 230 may assume that the object was recreated after the delete operation, and that another entry in the catch-up log 100, which the affected data store 230 has not yet read during the replay of the catch-up log 100, corresponds to a write operation recreating the object.

If the affected data store 230 determines that the object does not exist in the reference data store 240, then the affected data store 230 may proceed with the delete/erase operation in the affected data store 230.

Similarly, if the entry corresponds to a write operation, and if the affected data store 230 determines that the object does not exist in the reference data store 240, then the catch-up log entry corresponding to that object is not processed, but is instead discarded. That is, by determining that the object does not exist in the reference data store 240, the affected data store 230 may assume that the object was deleted after the write operation, and that another entry in the catch-up log 100, which the affected data store 230 has not yet read during the replay of the catch-up log 100, corresponds to the data modification operation deleting the object.

If the affected data store 230 determines that the object does exist in the reference data store 240, then the affected data store 230 may proceed with the write operation in the affected data store 230.

Accordingly, embodiments of the present disclosure provide an improved or optimal amount of data logged for each key-value operation, provide scalable organization of the catch-up log to allow concurrent parallel writers to the catch-up log, enable the removal of ordering constraints between related operations to allow playback in any order, and enable concurrent playback from the catch-up log to allow parallel recovery across multiple nodes in the cluster of the distributed object store.

The embodiments of the present disclosure are able to achieve logging of the entries in the catch-up log with zero contention, to achieve relatively small entry size to enable the logging of several million operations in the catch-up log to allow for an increased amount of available time for a planned outage, thereby using only a small amount of memory or storage that is dedicated to the catch-up log, and to achieve linear scalability while recovering in accordance with the catch-up log due to parallelism in processing of the catch-up log.

In the description, for the purposes of explanation, numerous specific details provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of synchronizing a distributed object store comprising a plurality of data stores, the method comprising:
performing a first operation at a first data store and at a second data store, such that the first data store and the second data store have a first state of an object;
performing a second operation on the object at the second data store, such that the second data store has a second state that is different from the first state;
generating an entry in a loci based on the second operation, the entry indicating a key associated with the object, and indicating the second state of the second data store as a result of the second operation;
performing a third operation on the object at the second data store, such that the second data store has the first state;
bringing the first data store having the first state online;
reading the entry indicating the second state of the second data store; and
based at least in part on:
accessing the second data store, which is based on the reading of the entry indicating the second state; and
determining that the second data store has the first state, maintaining the first state of the first data store.

2. The method of claim 1, further comprising causing the first data store to go offline in accordance with a maintenance operation.

3. The method of claim 1, further comprising storing the log on multiple nodes of a cluster underlying the distributed object store.

4. The method of claim 1, wherein the log comprises an unordered set of entries corresponding to respective data modification operations.

5. The method of claim 1, wherein the entry indicates a type of data modification operation.

6. The method of claim 1, wherein:
the entry comprises a delete entry;
the second operation comprises a delete operation; and the maintaining the first state of the first data store comprises checking, by the first data store, the second data store to determine that the object is contained in the second data store.

7. The method of claim 1, wherein:
the entry comprises a write entry;
the second operation comprises a write operation; and
the maintaining the first state of the first data store comprises checking, by the first data store, the second data store to determine that the object is absent from the second data store.

8. A distributed object store, as a non-transitory storage medium, comprising a plurality of data stores, the distributed object store being configured to be synchronized by:
performing a first operation at a first data store and at a second data store, such that the first data store and the second data store have a first state of an object;
performing a second operation on the object at the second data store, such that the second data store has a second state that is different from the first state;
generating an entry in a loci based on the second operation, the entry indicating a key associated with the object, and indicating the second state of the second data store as a result of the second operation;
performing a third operation on the object at the second data store, such that the second data store has the first state;
bringing the first data store having the first state online;
reading the entry indicating the second state of the second data store; and
based at least in part on:
accessing the second data store, which is based on the reading of the entry indicating the second state; and
determining that the second data store has the first state, maintaining the first state of the first data store.

9. The distributed object store of claim 8, wherein the distributed object store is further configured to be synchronized by causing the first data store to go offline in accordance with a maintenance operation.

10. The distributed object store of claim 8, wherein the distributed object store is further configured to be synchronized by storing the log on multiple nodes of a cluster underlying the distributed object store.

11. The distributed object store of claim 8, wherein the log comprises an unordered set of entries corresponding to respective data modification operations.

12. The distributed object store of claim 8, wherein the entry indicates a type of data modification operation.

13. The distributed object store of claim 8, wherein:
the entry comprises a delete entry;
the second operation comprises a delete operation; and
the maintaining the first state of the first data store comprises checking, by the first data store, the second data store to determine that the object is contained in the second data store.

14. The distributed object store of claim 8, wherein:
the entry comprises a write entry the second operation comprises a write operation; and
the maintaining the first state of the first data store comprises checking, by the first data store, the second data store to determine that the object is absent from the second data store.

15. A distributed object store system comprising a non-transitory computer readable medium having computer code that, when executed on a processor, implements a method of synchronizing a distributed object store comprising a plurality of data stores, the method comprising:
performing a first operation at a first data store and at a second data store, such that the first data store and the second data store have a first state of an object;
performing a second operation on the object at the second data store, such that the second data store has a second state that is different from the first state;
generating an entry in a loci based on the second operation, the entry indicating a key associated with the object, and indicating the second state of the second data store as a result of the second operation;
performing a third operation on the object at the second data store, such that the second data store has the first state;
bringing the first data store having the first state online;
reading the entry indicating the second state of the second data store; and
based at least in part on:
accessing the second data store, which is based on the reading of the entry indicating the second state; and
determining that the second data store has the first state, maintaining the first state of the first data store.

16. The distributed object store system of claim 15, wherein the computer code, when executed by the processor, further implements the method of synchronizing the distributed object store by causing the first data store to go offline in accordance with a maintenance operation.

17. The distributed object store system of claim 15, wherein the computer code, when executed by the processor, further implements the method of synchronizing the distributed object store by storing the log on multiple nodes of a cluster underlying the distributed object store.

18. The distributed object store system of claim 15, wherein the log comprises an unordered set of entries corresponding to respective data modification operations.

19. The distributed object store system of claim 15, wherein the entry indicates a type of data modification operation.

20. The distributed object store system of claim 15, wherein:
the entry comprises a delete entry
the second operation comprises a delete operation; and
the maintaining the first state of the first data store comprises checking, by the first data store, the second data store to determine that the object is contained in the second data store.

* * * * *